Nov. 24, 1925.   1,563,237
F. O. STALLMAN
LOADER
Filed May 28, 1925
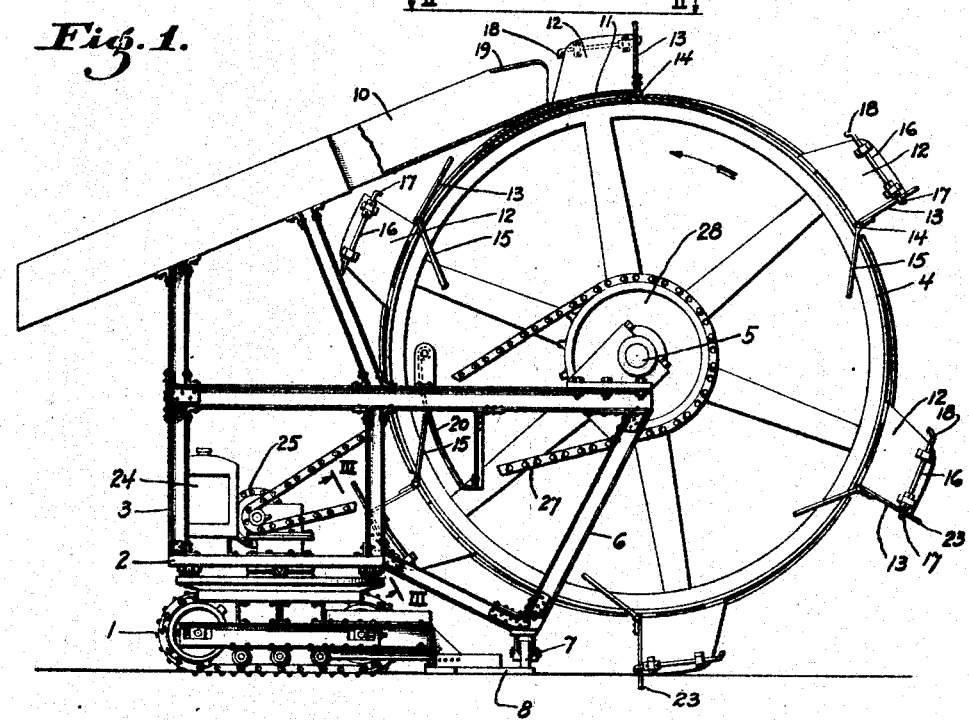
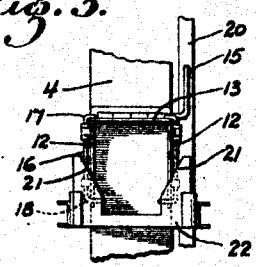
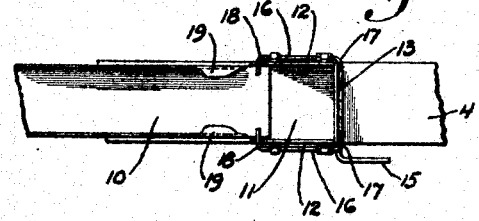
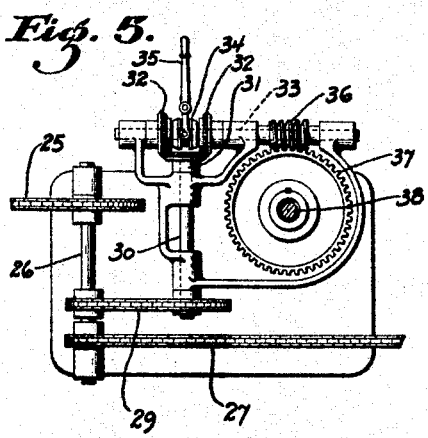
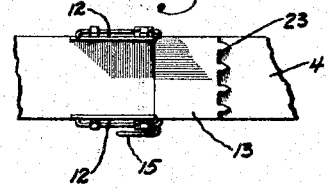
INVENTOR.
Frank O. Stallman.
BY Duvey, Strong
Townsend & Loftus
ATTORNEYS.

Patented Nov. 24, 1925.

1,563,237

UNITED STATES PATENT OFFICE.

FRANK O. STALLMAN, OF SAN FRANCISCO, CALIFORNIA.

LOADER.

Application filed May 28, 1925. Serial No. 33,395.

*To all whom it may concern:*

Be it known that I, FRANK O. STALLMAN, a citizen of the United States, residing at the city and county of San Francisco and State of California, have invented new and useful Improvements in Loaders, of which the following is a specification.

This invention relates to loaders particularly adapted for the scooping up and loading of sand and similar material.

I am aware that various mechanisms have heretofore been devised for this purpose. Such a mechanism ordinarily comprises a line of buckets mounted either on an endless carrying chain or on the periphery of a carrying wheel. My invention herein comprises such a carrying wheel so mounted on a tractor as to be readily moved by power to the positions most efficiently performing the loading functions. It is the primary object of my invention to provide an improved mechanism of this type.

My invention furthermore contemplates a carrying wheel having a plurality of scooping buckets in spaced relation on the periphery thereof, a receiving chute cooperating with the buckets, means permitting a portion of each bucket to collapse at the chute to permit the same to pass the chute, and means for thereafter re-forming the bucket and locking the same in such position. It is a further object of my invention to provide such an improved mechanism.

In the accompanying drawing, I have illustrated certain specific embodiments of my invention, but it will be understood that the invention can be otherwise embodied and that the drawing is not to be construed as defining or limiting the scope of the invention, the claims appended to this specification being relied upon for that purpose.

Referring to the figures of the drawing, Fig. 1 is a side elevation of my improved loader.

Fig. 2 is a fragmentary plan view thereof taken from line II—II above Fig. 1.

Fig. 3 is a fragmentary view taken on line III—III of Fig. 1.

Fig. 4 is a view like Fig. 2 but showing the rear wall of the bucket collapsed.

Fig. 5 is a fragmentary plan view showing the operating mechanism somewhat diagrammatically.

In the drawing, 1 indicates a tractor carriage on which is supported a turn-table 2 carrying the supporting frame 3 of my improved loader. A large bucket carrying wheel 4 is mounted for rotation on an axis 5 at the forward end of the frame. This forward end of the frame is supported by a sub-frame 6 having rollers 7 riding on a platform 8 carried by the tractor adjacent the ground.

A plurality of buckets are carried by the wheel and a receiving chute 10 is mounted on the frame in a manner cooperating with the buckets. Each bucket comprises a bottom portion 11, side portions 12, and a rear wall 13 pivoted at 14. Also carried by each rear wall 13 at the other side of the pivot 14 is a rod 15.

Rotatably mounted on each side portion 12 is a rod 16 having one end 17 thereof adapted to engage behind the wall 13 to hold the wall closed. The other end of each rod is bent at 18 to engage a cam 19 on the chute in a manner to rotate the rods and release the rear wall, thus permitting the wall to drop back and pass the chute.

After the bucket has passed the chute, the plate 15 engages a wiper plate 20 in a manner closing the rear wall 13 as the bucket passes by. Thereafter the ends 18 of the rods engage cam surfaces 21 of a plate 22 in a manner to rotate the rods into the rear wall locking position as the bucket passes by such plate. The outer end of each wall plate 13 is preferably provided with a plurality of teeth 23 which in operation dig into and assist in loosening the soil.

The mechanism is driven by an engine 24 mounted on the turn-table. A chain 25 from the engine drives a shaft 26. A chain 27 connects this shaft with a large sprocket wheel 28 on the bucket wheel 4. A chain 29 drives a shaft 30 having a bevel gear 31 thereon in mesh with two bevel gears 32 loose on a shaft 33. A clutch 34, splined to the shaft 33, can be shifted by a lever 35 into engagement with either gear 32 to drive the shaft 33 in either direction. A worm 36 on shaft 33 meshes with a worm wheel 37 immovably keyed to the tractor carriage. Rotation of the shaft 33 in one direction or the other is therefore adapted to swing the frame about the vertical axis 38.

It is believed that the construction and operation of my invention will be clear without further description herein.

The tractor operates to force the bucket wheel 4 into the bank of sand or other material to be moved. The wheel is then rotated in the direction of the arrow. The teeth 23 loosen the material and the buckets scoop themselves full and carry the material to the upper end of the chute 10. The material in the bucket is crowded into the chute, and just as the rear wall 13 is about to engage the chute end the rod ends 18 ride onto the cams 19, rotate the rods, and release the locking ends 17. The rear wall 13 is there-upon permitted to pivot back in a manner permitting the bucket to pass the chute.

After the bucket has passed the chute, the plate 15 of the rear wall engages the wiper plate 20 and closes the rear wall, the rod ends 18 thereafter engaging the cam surfaces 21 which rotate the rods to move the ends 17 into locking position behind the rear wall. These operations are entirely automatic, the sand being dumped into the top of the chute and delivered to a truck placed behind the tractor.

The wheel 4 and its carrying frame can be swung laterally in either direction to different positions by engaging the clutch 34 with one or the other of the bevel gears 32, all of which will be obvious. In operation the platform 8 may rest on the ground to assist in supporting the thrust of the wheel 4.

Having thus described my invention, what I claim and desire to secure by Letters Patent is—

1. A loader comprising the combination of a portable carriage, a relatively large wheel mounted on a horizontal axis thereon, a plurality of scoop buckets carried in spaced relation on the periphery of the wheel, a portion of each bucket being collapsible relative to the remainder of the bucket, power means for rotating the wheel in one direction, a chute cooperating with the buckets to receive material therefrom as the wheel is rotated in the said one direction, means permitting the said portion of each bucket to collapse at the chute to permit the buckets to pass the chute, and means for automatically re-forming the buckets after they have passed the chute.

2. A loader comprising the combination of a portable carriage, a relatively large wheel mounted on a horizontal axis thereon, a plurality of scoop buckets carried in spaced relation on the periphery of the wheel, the rear wall of each bucket being collapsible relative to the remainder of the bucket, power means for rotating the wheel in one direction, a chute cooperating with the buckets to receive material therefrom as the wheel is rotated in the said one direction, and means permitting the said rear wall of each bucket to collapse at the chute to permit the buckets to pass the chute.

3. A loader comprising the combination of a portable carriage, a relatively large wheel mounted on a horizontal axis thereon, a plurality of scoop buckets carried in spaced relation on the periphery of the wheel, each bucket having a rear wall pivoted relative to the remainder of the bucket, means locking the wall in closed position, power means for rotating the wheel in one direction, a chute cooperating with the buckets to receive material therefrom as the wheel is rotated in the said one direction, and means automatically releasing the locking means at the chute to permit each wall to drop and the buckets to pass the chute.

4. Claim 3 plus means for automatically closing each rear wall after it has passed the chute.

5. Claim 3 plus means for automatically closing each rear wall after it has passed the chute, and means for automatically engaging the locking means to hold the wall closed.

6. A loader comprising the combination of a portable carriage, a relatively large wheel mounted on a horizontal axis thereon, a plurality of scoop buckets carried in spaced relation on the periphery of the wheel, each bucket having a rear wall pivoted relative to the remainder of the bucket, means locking the wall in closed position, power means for rotating the wheel in one direction, a chute cooperating with the buckets to receive material therefrom as the wheel is rotated in the said one direction, and cam means automatically releasing the locking means at the chute to permit each wall to drop and the buckets to pass the chute.

7. Claim 6 plus cam means for automatically closing each rear wall after it has passed the chute.

8. Claim 6 plus cam means for automatically closing each rear wall after it has passed the chute, and cam means for automatically engaging the locking means to hold the wall closed.

9. A loader comprising the combination of a portable carriage, a frame mounted for horizontal swinging movement on a vertical axis thereon, a large wheel mounted on a horizontal axis on the frame, a plurality of scoop buckets carried in spaced relation on the periphery of the wheel, power means for rotating the wheel in one direction, a chute cooperating with the buckets to receive material therefrom as the wheel is rotated in the said one direction, the chute extending downwardly from adjacent the top of the wheel over the carriage to a position overhanging the space at the opposite side of the carriage and power driven means for swinging the frame about the said vertical axis.

FRANK O. STALLMAN.